United States Patent
Hurng et al.

(10) Patent No.: US 9,263,762 B2
(45) Date of Patent: Feb. 16, 2016

(54) LITHIUM ION BATTERIES

(71) Applicant: LanYang Energy Technology Co., Ltd., Yangmei, Taoyuan County (TW)

(72) Inventors: Weir-Mirn Hurng, Hsinchu County (TW); Chienyang Cheng, Hsinchu County (TW); Yuwei Huang, Hsinchu County (TW)

(73) Assignee: Lanyang Energy Technology Co., Ltd., Yangmei (TW)

( * ) Notice: Subject to any disclaimer, the term of this patent is extended or adjusted under 35 U.S.C. 154(b) by 158 days.

(21) Appl. No.: 14/087,236

(22) Filed: Nov. 22, 2013

(65) Prior Publication Data

US 2015/0145482 A1 May 28, 2015

(51) Int. Cl.
| | |
|---|---|
| *H02J 7/00* | (2006.01) |
| *H01M 10/04* | (2006.01) |
| *H01M 2/10* | (2006.01) |
| *H01M 2/20* | (2006.01) |
| *H01M 2/24* | (2006.01) |
| *H01M 10/0525* | (2010.01) |

(52) U.S. Cl.
CPC ........ *H01M 10/0431* (2013.01); *H01M 2/1022* (2013.01); *H01M 2/1077* (2013.01); *H01M 2/206* (2013.01); *H01M 2/24* (2013.01); *H01M 10/0525* (2013.01); *H02J 7/007* (2013.01); *H02J 7/0014* (2013.01)

(58) Field of Classification Search
CPC .... H01M 10/0431; H02J 7/007; H02J 7/1004
USPC ......................................................... 320/134
See application file for complete search history.

(56) References Cited

U.S. PATENT DOCUMENTS

| | | | |
|---|---|---|---|
| 6,664,007 B2 | 12/2003 | Hamano et al. | |
| 7,560,192 B2 | 7/2009 | Hwang et al. | |

(Continued)

FOREIGN PATENT DOCUMENTS

| | | |
|---|---|---|
| JP | 2004-006382 | 1/2004 |
| JP | 2010-123299 | 6/2010 |

(Continued)

OTHER PUBLICATIONS

Shannon, Geoff "Battery Welding Solutions Using Laser and Resistance Technologies", Battery Power Products & Technology, vol. 13, 6, 2009.

(Continued)

*Primary Examiner* — Sun Lin
(74) *Attorney, Agent, or Firm* — Cesari and McKenna LLP

(57) ABSTRACT

A lithium ion battery having a plurality of cells connected in series, in parallel, or both internally within a sealed case. Each of the plurality of cells has a cathode in contact with a positive current collector and an anode in contact with a negative current collector. The battery also includes a single positive terminal in electrical contact with at least one positive current collector and a single negative terminal in electrical contact with at least one negative current collector. One or more cross-over connectors electrically connect adjacent positive and negative current collectors. Also provided is a lithium ion battery having externally connected cells, the battery also having a single negative terminal in electrical contact with at least one negative current collector and one or more cross-over connectors that electrically connect adjacent positive and negative current collectors of the cells.

23 Claims, 13 Drawing Sheets

(56) References Cited

U.S. PATENT DOCUMENTS

| | | |
|---|---|---|
| 7,803,481 B2 | 9/2010 | Howard et al. |
| 7,968,221 B2 | 6/2011 | Hatanaka et al. |
| 2002/0187399 A1 | 12/2002 | Johnson et al. |
| 2003/0003369 A1 | 1/2003 | Dai |
| 2005/0170248 A1 | 8/2005 | Zhang et al. |
| 2009/0311588 A1 | 12/2009 | Lim et al. |
| 2009/0317706 A1 | 12/2009 | Tu |
| 2010/0124693 A1 | 5/2010 | Kosugi et al. |
| 2013/0309919 A1 | 11/2013 | Oda et al. |

FOREIGN PATENT DOCUMENTS

| | | |
|---|---|---|
| JP | 2011-067012 | 3/2011 |
| JP | 2012-022937 | 2/2012 |
| JP | 2012-038468 | 2/2012 |
| JP | 2012-160339 A | 8/2012 |
| JP | 2013-051175 A | 3/2013 |
| JP | 2013-143271 | 7/2013 |
| JP | 2013-197016 | 9/2013 |
| KR | 10-2009-0129937 A | 12/2009 |
| TW | 546862 | 8/2003 |
| TW | 550847 | 9/2003 |
| TW | M347691 | 12/2008 |
| TW | 201232907 | 8/2012 |
| TW | I404251 | 8/2013 |
| WO | WO-2012/102160 A1 | 8/2012 |

OTHER PUBLICATIONS

Hu, S. Jack, "Lithium-ion Battery Manufacturing" The University of Michigan, Department of Mechanical Engineering.

Lee,Seungjae "Process and Quality Characterization for Ultrasonic Welding of Lithium-Ion Batteries", University of Michigan, 2013.

Chen, Jiajun, "Recent Progress in Advanced Materials for Lithium Ion Batteries", Materials, vol. 6, pp. 156-183, 2013.

Whittingham, M. Stanley, "Lithium Batteries and Cathode Materials" Chem. Rev, vol. 104, pp. 4271-4301, 2004.

Xu, Kang, "Nonaqueous Liquid Electrolytes for Lithium-Based Rechargeable Batteries" Chem. Rev. vol. 104, pp. 4303-4417, 2004.

Zhang, Sheng Shui, "A review on the separators of liquid electrolyte Li-ion batteries", Journal of Power Sources, vol. 164, pp. 351-364, 2007.

Moore, Stephen W., et al., "A Review of Cell Equalization Methods for Lithium Ion and Lithium Polymer Battery Systems", Society of Automotive Engineers, Inc., 2001.

Karpin, Oleksandr, "Power Management—Battery Charger with Cell-Balancing and Feul Gauge Function Support", Cypress Perform, 2011.

Texas Instrument, "Voltage Protection with Automatic Cell Balance for 2-Series Cell Li-Ion Batteries" www.ti.com, Sep. 2010.

LITHIUM ION BATTERIES

BACKGROUND

Lithium ion cells have become widespread and popular since the introduction of the first commercial rechargeable lithium battery in 1991. The high energy density of lithium ion cells makes them ideal for use in portable devices, including cell phones, portable computers, and electric/hybrid electric vehicles.

A lithium ion cell is composed of four key components: a cathode, an anode, a separator, and an electrolyte. As the cell charges, the cathode is oxidized to provide lithium ions and electrons to the anode. During discharge, the cathode is reduced back to its original state, while at the same time the anode is oxidized to provide lithium ions and electrons. The separator prevents the cathode from directly contacting the anode thereby creating a short circuit. At the same time, the separator allows current-carrying ions to pass from the cathode to the anode and vice-versa. The electrolyte provides a path for the lithium ions to travel between the cathode and the anode.

Typically, the above components are held within a sealed case. The case includes a safety vent to prevent abnormal pressure from building up inside the lithium ion cell during discharge, charging, and during a short circuit. There are three main types of lithium ion cell case structures, namely, cylindrical, prismatic, and pouch-style.

A lithium ion cell typically generates a voltage of 3 to 4 volts. To construct a battery of higher voltage, it is necessary to connect individual cells in series externally to form a battery pack of the desired voltage. Lithium ion cells can also be connected in parallel to increase the amount of current that the battery pack can provide.

A typical lithium ion battery pack includes a battery management system. The purpose of the battery management system is to avoid overcharging and over-discharging individual cells within the battery pack.

The need exists for a lithium ion battery that is easier and less costly to construct than existing batteries.

SUMMARY

To overcome the drawbacks of existing lithium ion batteries, a battery is provided that contains lithium ion cells which are connected internal to the case.

The lithium ion battery includes a plurality of lithium ion cells aligned parallel to each other. Each lithium ion cell contains a cathode in electronic contact with a positive current collector, an anode in electronic contact with a negative current collector, a separating unit that separates the cathode from the anode, and an electrolyte in contact with the cathode, the anode, and the separating unit. The battery also includes a single positive terminal in direct contact with one or more of the positive current collectors but not any of the negative current collectors, a single negative terminal in direct contact with one or more of the negative current collectors but not any of the positive current collectors, and one or more cross-over connectors that each electrically connect with one or more of the positive current collectors and one or more of the negative current collectors.

All of the above components are contained within a case having a cover that encloses the case. The positive terminal described above extends through a first opening in the cover and the negative terminal extends through a second opening. The case includes a divider that divides the case into at least two compartments, each compartment housing one or more of the lithium ion cells.

Additionally, each cathode contains a lithium cathode material; each anode contains an anode material; each separating unit contains a micro-porous material; the electrolyte is a liquid, a gel, or a polymeric solid; each of the positive terminal, the negative terminal, the positive current collectors, and the negative current collectors contains a metal tab; and each of the cross-over connectors contains a metal bar.

The details of one or more embodiments of the invention are set forth in the drawings and description below. Other features, objects, and advantages of the invention will be apparent from the description and from the claims. The contents of all documents cited herein are hereby incorporated by reference in their entirety.

DETAILED DESCRIPTION

Figure 1A:
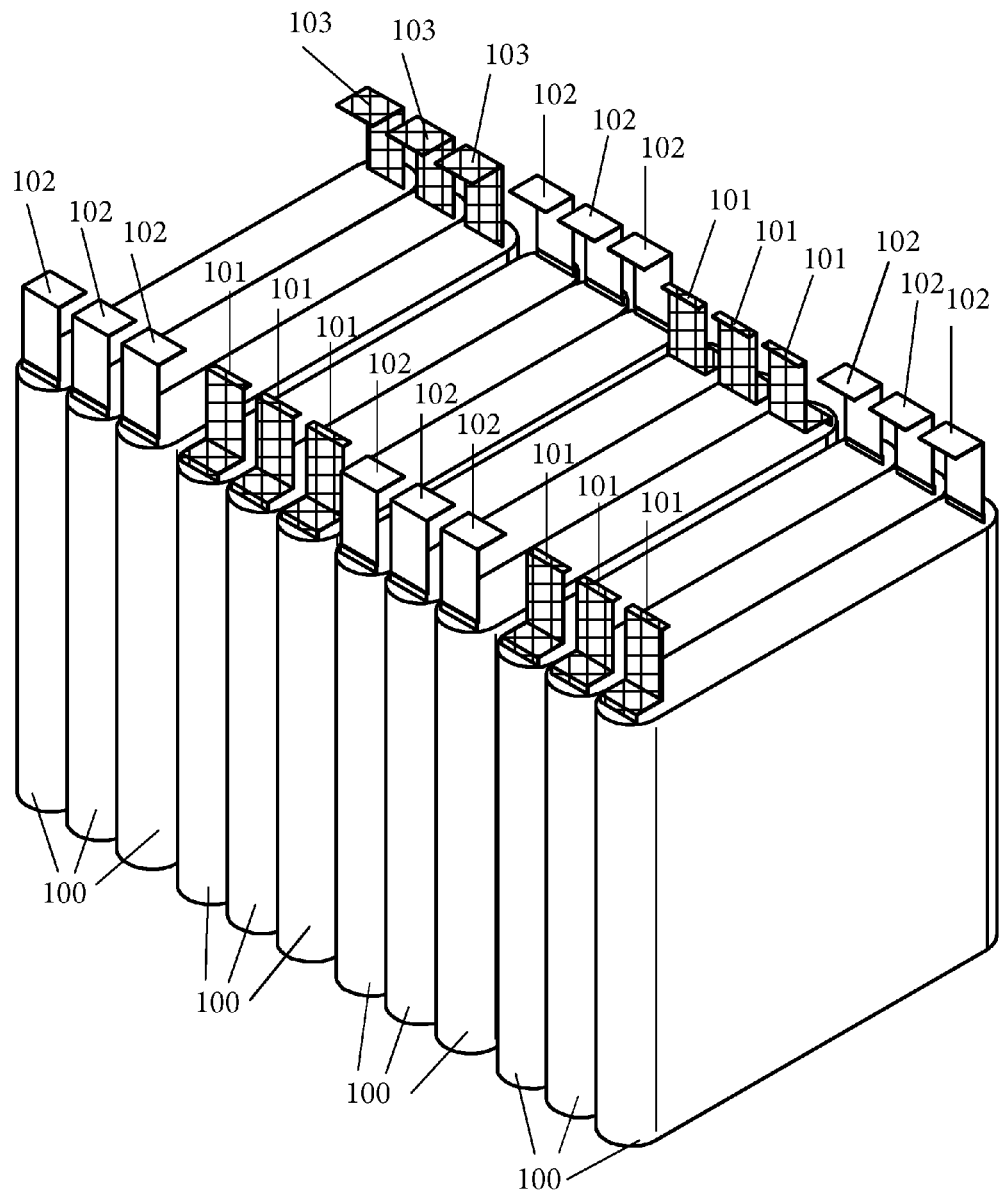
FIG. 1A is a view of a 12-cell lithium ion battery showing an internal view of the lithium ion cells inside the case.

As mentioned above, the need exists for a lithium ion battery that is easier and less costly to construct than existing batteries.

To meet that need, a lithium ion battery is provided that includes a plurality of lithium ion cells aligned parallel to each other inside a single sealed case. The lithium ion cells can be electrically connected to each other in series, in parallel, or both. Advantageously, the connections between the individual lithium ion cells can be made inside of the case prior to sealing the case with a cover. In another embodiment, the lithium ion cells are connected in series, in parallel, or both external to the case.

Advantageously, each lithium-ion cell in the battery is not individually encased in a sealed container. Thus, there is no need to fabricate individual sealed cells first and then connect them to form the battery. Additionally, the desired battery voltage is taken into account at the earliest design stage. For example, the case size can be selected depending upon the number of cells that will be needed to generate the desired voltage and current capacity. This approach requires less material and lowers manufacturing cost as compared to typical lithium ion batteries.

The anode is formed by coating an anode material onto an negative current collector. The anode material can be, e.g., lithium titanium oxide ($LiTi_4O_9$), silicon, and silicon/silicon oxide/carbon, or a mixture of these materials. Additional suitable anode materials are described in Materials 6:156-183. The negative current collector can include copper, nickel, nickel-plated steel, stainless steel, or titanium. Preferably, the negative current collector is formed of copper.

Similar to the anode, the cathode is formed by coating a cathode material onto a positive current collector. The cathode material can be, but is not limited to lithium cobalt oxide ($LiCoO_2$; LCO), lithium nickel oxide ($LiNiO_2$; LNO), lithium manganese oxide ($LiMn_2O_4$; LMO), lithium iron phosphate ($LiFePO_4$; LFP), and lithium (nickel, manganese, cobalt) oxide ($Li(Ni, Mn, Co)O_2$; NMC), or a mixture of these materials. Additional cathode materials that can be used are described in Chemical Reviews 104:4271-4301 and Materials 6:156-183. In a preferred embodiment, the cathode material is LFP.

The positive current collector can be formed of nickel, stainless steel, or aluminum. In a preferred embodiment, the positive current collector is formed of aluminum.

Turning to the separator material, this material can be a microporous polymer membrane, a non-woven fabric mat, or an inorganic composite membrane. Examples of a microporous polymer membrane include, but are not limited to polyethylene (PE), polypropylene (PP), a PE-PP blend, and a blend of high density polyethylene and ultra-high molecular weight polyethylene. The non-woven fabric mat can be formed of, e.g., cellulose, chemically modified cellulose, polyolefin, polyamide, polytetrafluoroethylene, polyvinylidene fluoride, polyvinyl chloride, and polyester. The inorganic composite membrane can be a porous mat formed of ultrafine inorganic particles, such as ceramic particles, bonded to a matrix using a small amount of binder. For example, an inorganic composite membrane can be formed of $Al_2O_3/SiO_2$ bonded to a polyethylene terephthalate non-woven support matrix. Additional suitable separator materials are described in J. Power Sources 164:351-364. In a preferred embodiment, the separator material is a microporous polymer membrane.

The electrolyte can be a liquid, a gel, or a polymeric solid. For example, a liquid electrolyte can be a lithium salt dissolved in an organic solvent. Exemplary lithium salts include $LiPF_6$, $LiBF_4$, and $LiClO_4$. Organic solvents that can be used include, but are not limited to ethylene carbonate, dimethyl carbonate, ethylmethyl carbonate, propylene carbonate, and diethyl carbonate. The organic solvents can be combined together to form binary, ternary, quaternary, and pentanary mixtures. Additional suitable lithium salts and organic solvents are described in U.S. Pat. No. 6,245,464.

In another embodiment, composite electrolytes based on poly-oxyethylene (POE) can be used. High molecular weight POE can be used to make solid electrolytes for use in a dry Li-polymer cell. Alternatively, low molecular weight POE can be used in the electrolyte for a wet Li-ion cell. Additional suitable electrolytes are described in Chemical Reviews 104: 4303-4417.

Each unit cell can be constructed of multiple flat anode plates and multiple flat cathode plates separated from each other by a separator material. In this configuration, all of the anode plates are electrically connected to each other, and all of the cathode plates are likewise electrically connected to each other. The number of plates can be selected based on the desired current capacity of the battery.

To construct a battery with higher current carrying capacity, it is necessary to increase the active surface area of the anode and cathode without overly increasing the size of each cell. This can be achieved by producing the cells in a so-called "jelly-roll" format. In such a format, the anode, the cathode, and the separator material are formed as a continuous strip. After stacking the strips such that the separator material strip is between the anode material strip and the cathode material strip, the stacked strips are rolled up in a spiral fashion to create the jelly-roll. In a preferred embodiment, two strips of separator material are used with an anode and cathode to form the jelly-roll. For example, the stack of continuous strips includes, in order, the first strip of separator material, the anode, the second strip of the separator material, and the cathode. Upon rolling up of the stack, the first strip of separator material will form the outer surface of the jelly-roll. A jelly-roll formed in this way can be placed adjacent to another jelly-roll without creating a short-circuit between the two cells.

In the jelly-roll embodiment, the anode is constructed of a thin foil negative current collector coated with the anode material, and the cathode is formed of a thin foil positive current collector coated with the cathode material.

Advantageously, the jelly-roll cell has a very low internal resistance. Additionally, the jelly-roll can be adapted to different form factors, e.g., a cylindrical shape or a flattened oblong shape, depending upon the desired battery design. The size of the jelly-roll can also be adapted to fit a specific case size. In a particular embodiment, the jelly-roll is 20 cm×30 cm.

In order to electrically connect the anode and the cathode of each cell to other components of the battery, a connector tab is provided on each of the anode and the cathode. The anode includes an negative connector tab formed of nickel that is attached to the negative current collector. The cathode includes a positive connector tab formed of aluminum that is attached to the positive current collector. The negative connector tab and the positive connector tab can be attached to their respective current collectors by resistance welding, ultrasonic welding, or laser welding. For example, see the November/December 2009 issue of Battery Power Products & Technology found on the world wide web at batterypoweronline.com.

As mentioned above, the individual lithium-ion cells can be electrically connected to each other in series, in parallel, or both. To accomplish this, cross-over connectors are provided which can be attached to both a negative connector tab and a positive connector tab to connect cells in series. The same cross-over connector can be attached to more than one negative connector tab and more than one positive connector tab to simultaneously establish a parallel and series connection. The cross-over iii connector can be formed of a conductive metal such as nickel, copper, and aluminum. Plated or clad metals can also be used, for example, nickel-plated copper, nickel-plated aluminum, a nickel-copper clad, and a nickel-aluminum clad. In a preferred embodiment, the cross-over connector is formed of a nickel-aluminum clad.

The cross-over connector can be attached to the negative connector tab and the positive connector tab by a welding process, e.g., resistance welding, ultrasonic welding, or laser welding. In some embodiments, a parallel connector is provided which is welded to two or more negative connector tabs but not to any positive connector tabs.

Also included in a lithium ion battery is a single positive terminal in direct contact with one or more of the positive connector tabs and a single negative terminal in direct contact with one or more of the negative connector tabs. The positive terminal is welded to the positive connector tab and the negative terminal is welded to the negative connector tab. The terminals serve as connecting points to a circuit for which the battery will supply power.

A case is included which houses the lithium ion cells, the positive terminal, the negative terminal, and the cross-over connectors and contains the electrolyte therein. The case can be formed of metal or plastic. In a preferred embodiment, the case is formed of plastic.

The case includes internal dividers which divide the case into compartments. The internal dividers physically separate the cells from each other. The internal dividers can be equally spaced within the case, thereby creating compartments having an equal volume. Each compartment can contain a single jelly-roll cell or a set of parallel connected jelly-roll cells. For example, 4 jelly-roll cells can be housed within a case having three internal dividers forming 4 compartments, with one jelly-roll in each compartment. Alternatively, 4 groups of 3 jelly-rolls can be housed in a case having three internal dividers forming 4 compartments, with 3 jelly-rolls in each compartment. The internal dividers can be formed of the same material as the case.

The case is closed by a case cover that is sealed to the case during manufacturing of the battery. The case cover includes safety vents to prevent excessive pressure build-up inside the case during charging or discharging of the battery. In some embodiments, the case cover can include connector tab slots through which the positive connector tabs and the negative connector tabs protrude. This allows for connections to be made external to the sealed case. For example, connections can be made between the positive connector tabs and the cross-over connector or between the negative connector tabs and the cross-over connector on the outer surface of the case cover.

In an embodiment that includes connections between cells external to the case, a second outer cover is included to protect the connections from the environment. The outer cover includes an outer positive terminal and an outer negative terminal that provide connection points to an external load or charging device. The outer positive terminal on the outer cover can be connected to the positive terminal on the outer surface of the case cover via a positive terminal connector. Similarly, the outer negative terminal on the outer cover can be connected to the negative terminal on the outer surface of the case cover via a negative terminal connector.

A battery having the desired voltage and current capacity can be constructed using multiple lithium ion cells in a single sealed case. For example, to construct a 12 V battery with a current capacity of 30 Ah, 4 lithium ion cells each having a 30 Ah current capacity are placed in the case and connected in series. Alternatively, a battery having the same voltage and capacity can be obtained by connecting three lithium ion cells in parallel, each cell having a capacity of 10 Ah. Four such parallel connected cells are connected in series to form a 12 V, 30 Ah battery.

As mentioned above, the connector tabs attached to the current collectors can be connected to each other via a cross-over connector. The cross-over connector can be used to connect multiple negative connector tabs, multiple positive connector tabs, or to connect the negative connector tabs to the positive connector tabs. For example, to connect two cells in parallel, the two negative connector tabs are connected by one cross-over connector and the two positive connector tabs are connected by a second cross-over connector. Similarly, two cells can be connected in series by connecting the negative connector tabs of the first cell to the positive connector tabs of the second cell via a cross-over connector. The cross-over connectors can be attached to the connector tabs by resistance welding, ultrasonic welding, or laser welding.

Standardized modules can be used to minimize cost and simplify maintenance of a battery pack. For example, using a 3 V lithium ion cell having a 30 Ah current capacity, batteries having the following voltage/current capacity combinations can easily be constructed: (i) 12 V/30 Ah (4×30 Ah cells in series); (ii) 12 V/60 Ah (two sets of parallel connected 4×30 Ah cells in series); (iii) 24 V/30 Ah (8×30 Ah cells in series); (iv) 12 V/90 Ah (3 sets of parallel connected 4×30 Ah cells in series); (v) 36 V/30 Ah (12×30 Ah cells in series); and (vi) 48 V/30 Ah (16×30 Ah cells in series).

Advantageously, lithium ion batteries can be constructed to replace commonly used battery types. For example, a lithium ion battery described above that includes 4 cells in series can replace a 12V lead acid battery, and a lithium ion battery including 8 series-connected cells can replace a 24V lead acid battery.

In an embodiment, a battery management system is included. The battery management system can include one or more cell balancing devices that equalize voltage between individual lithium ion cells in the battery during charging. For example, a charge-shunting cell balancing method can be used to selectively shunt the charging current around each cell as they become fully charged. Additionally, active cell balancing methods can be used in which an active charge shuttling element or voltage or current converters move energy from one cell to another. Charge shuttling elements remove charge from a selected cell, stores that charge in a capacitor, and then delivers it to another cell. Energy conversion devices include inductors or transformers which move energy from a cell or group of cells to another cell or group of cells.

In some embodiments, a battery management system is not included. Advantageously, this significantly reduces the fabrication cost of such a battery.

Without further elaboration, it is believed that one skilled in the art can, based on the description above, utilize the present invention to its fullest extent. The specific examples below are to be construed as merely illustrative, and not limitative of the remainder of the disclosure in any way whatsoever.

Example 1

Lithium Ion Battery Including 12 Lithium Ion Cells

Figure 1B:
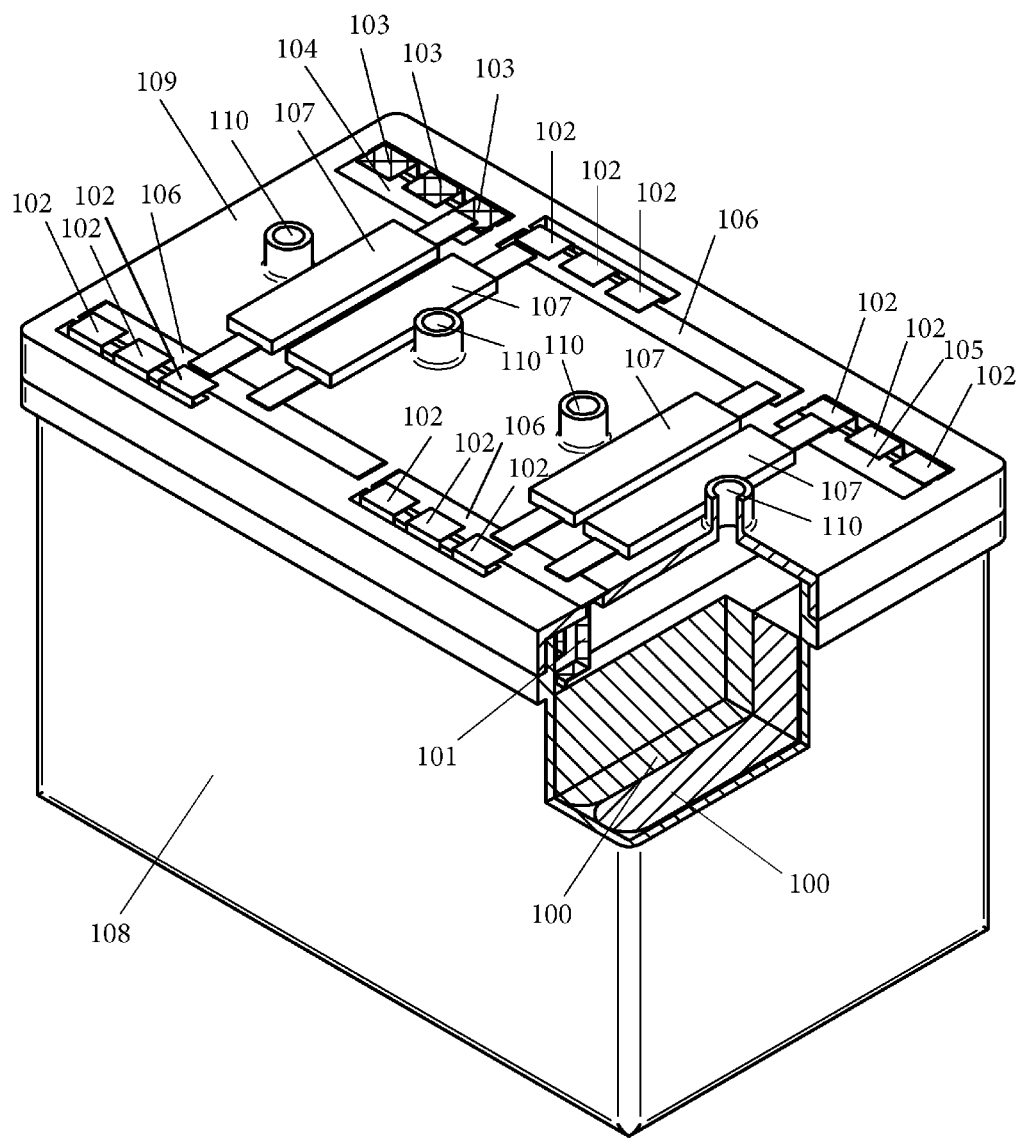
FIG. 1B is a view of the 12-cell lithium ion battery depicted in FIG. 1A showing a cutaway view of the cells inside the case showing the parallel and series connections between cells.
Figure 1C:
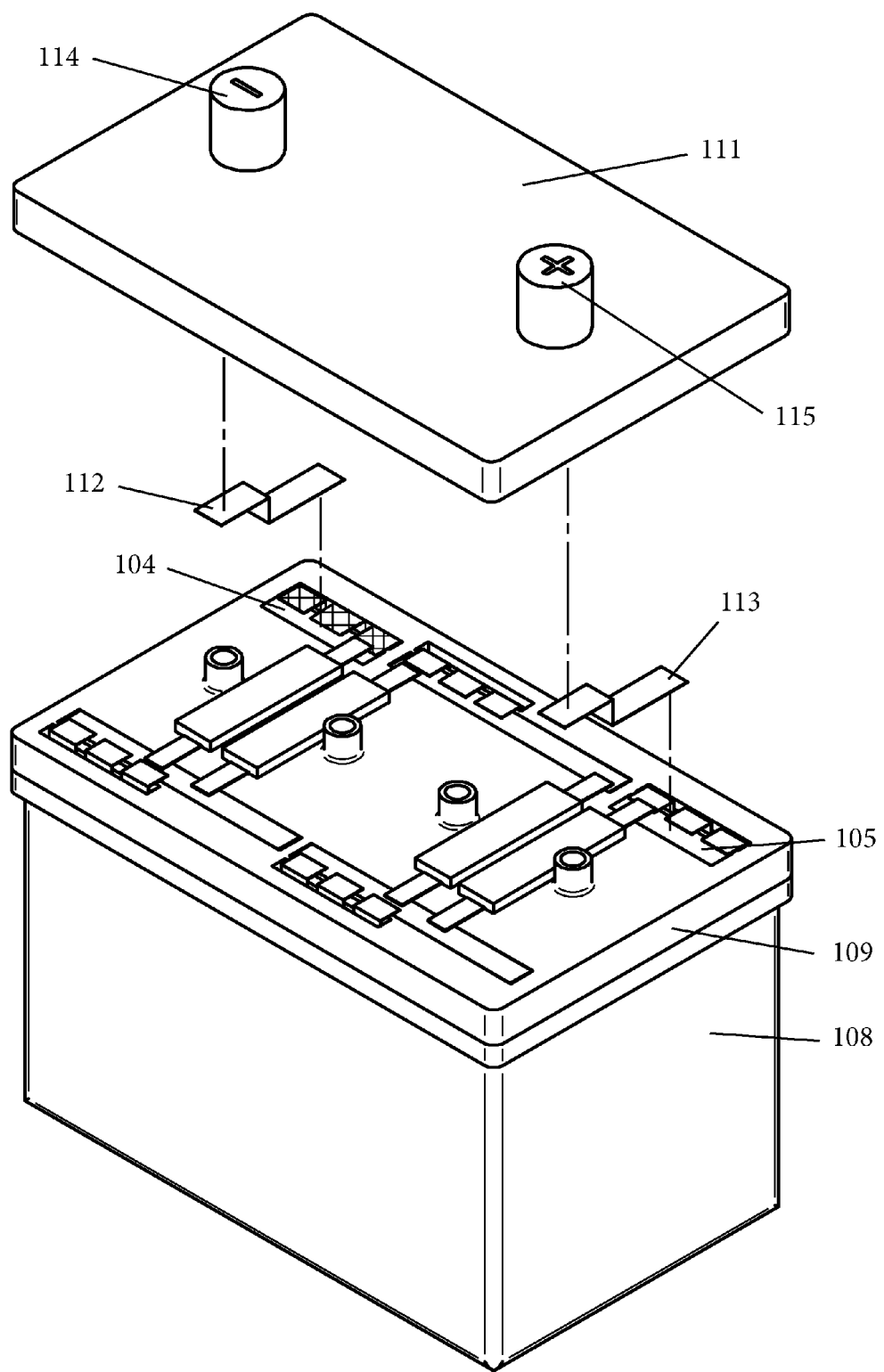
FIG. 1C is a view of a 12-cell lithium ion battery showing an alternative embodiment having an outer cover.
Figure 1D:
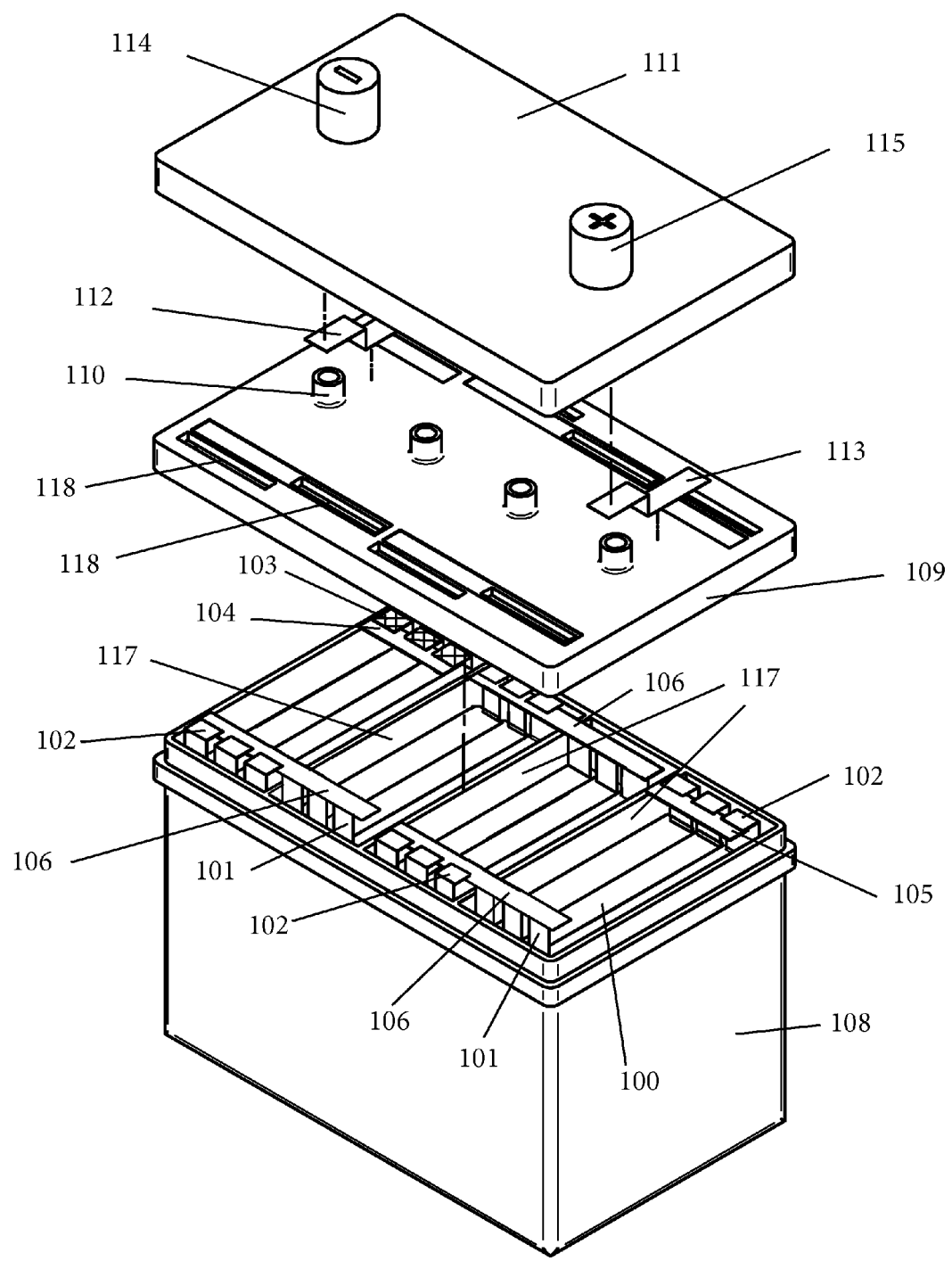
FIG. 1D is a view of a 12-cell lithium ion battery showing an exploded view of another embodiment.
Figure 1E:
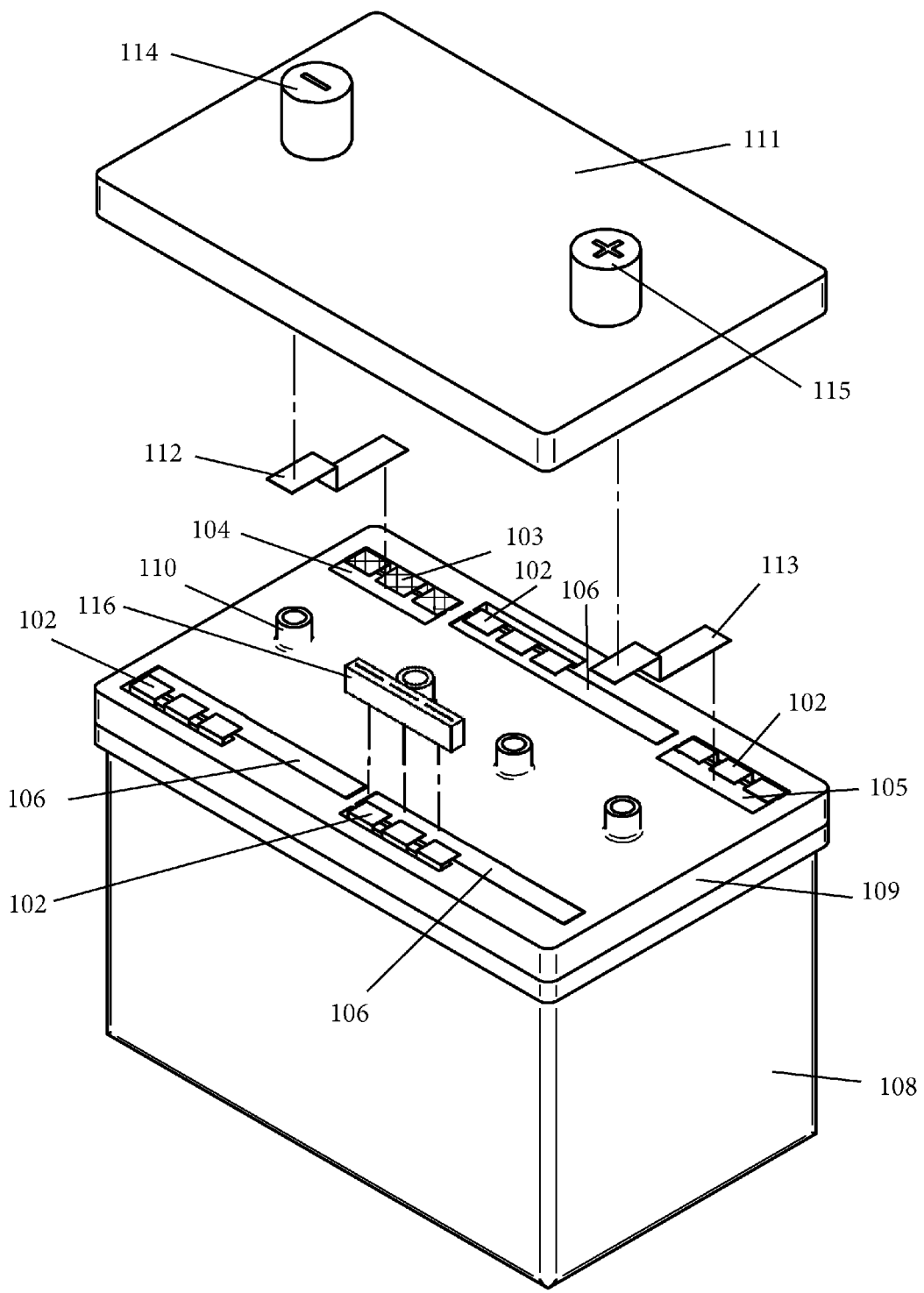
FIG. 1E is a view of a 12-cell lithium ion battery showing a view of a partially assembled battery shown in FIG. 1D.

Referring to FIG. 1A, an internal view of a 12-cell lithium ion battery is depicted. Each cell (100) is a prismatic jelly-roll cell arranged substantially parallel to the other cells (100) and includes a positive current collector and a negative current collector internal to the prismatic jelly-roll cell (100). The positive current collector and the negative current collector are connected to a positive connector tab (102) and a negative connector tab (101, 103). In the embodiment depicted in FIG. 1B, the cells (100) are interconnected via a cross-over connector (106) which is attached to three positive connector tabs (102) and three negative connector tabs (101). Three cells (100) are connected to each other in parallel via the cross-over connector (106), and each group of three parallel connected cells (100) are connected in series with another group of three parallel connected cells (100) via the cross-over connector (106). A negative terminal (104) is connected to three negative connector tabs (103), and a positive terminal (105) is connected to three positive connector tabs (102). The cells (100) are contained within a case (108) that includes a case cover (109) having one or more safety vents (110). In the embodiment depicted in FIG. 1B, the connections between cells (100) via the cross-over connectors (106) are external to the case cover (109). Optionally, a cell balancing device (107) can be included to normalize cell voltage during use. The cell balancing device (107) is connected between a cross-over connector (106) and the negative terminal (104), between two cross-over connectors (106), or between a cross-over connector (106) and the positive terminal (105). Referring to FIG. 1C, the battery can include an outer cover (111) attached to the case cover (109). The outer cover (111) protects the various connectors on the surface of the case cover (109). The outer cover includes an outer negative terminal (114) and an outer positive terminal (115) for connecting the battery to an external load or a charging device. The outer negative terminal (114) is connected to the negative terminal (104) via a negative terminal connector (112). Similarly, the outer positive terminal (115) is connected to the positive terminal (105) via a positive terminal connector (113). Turning to FIG. 1D, the case (108) can be divided into compartments by one or more divider (117). The dividers (117) physically separate cells (100) or groups of cells from each other and also retain the electrolyte within each compartment. The case cover (109) includes connector tab slots (118). The positive connector tabs (102) and negative connector tabs (101, 103) extend through the case cover (109) through the connector tab slots such that the parallel and series connections between cells (100) can be made external to the case cover (109). As in FIG. 1C, an outer cover (111) protects the various connectors on the surface of the case cover (109). FIG. 1E shows the positive connector tabs (102) and negative connector tabs (101, 103) extending through the case cover (109) through the connector tab slots (118). Also shown are the cross-over connectors (106), the negative terminal (104), and the positive terminal (105) on the surface of the case cover (109). A sealing plug (116) is provided to seal the connector tab slots (118). The positive connector tabs (102) and negative connector tabs (101, 103) extend through the case cover (109) through the sealing plug (116) inserted into the connector tab slots (118). The sealing plug (116) keeps the electrolyte from leaking out of the case (108) and also prevents direct contact between the electrolyte and the positive connector tabs (102) and negative connector tabs (101, 103).

Example 2

Lithium Ion Battery Including 24 Lithium Ion Cells

Figure 2A:
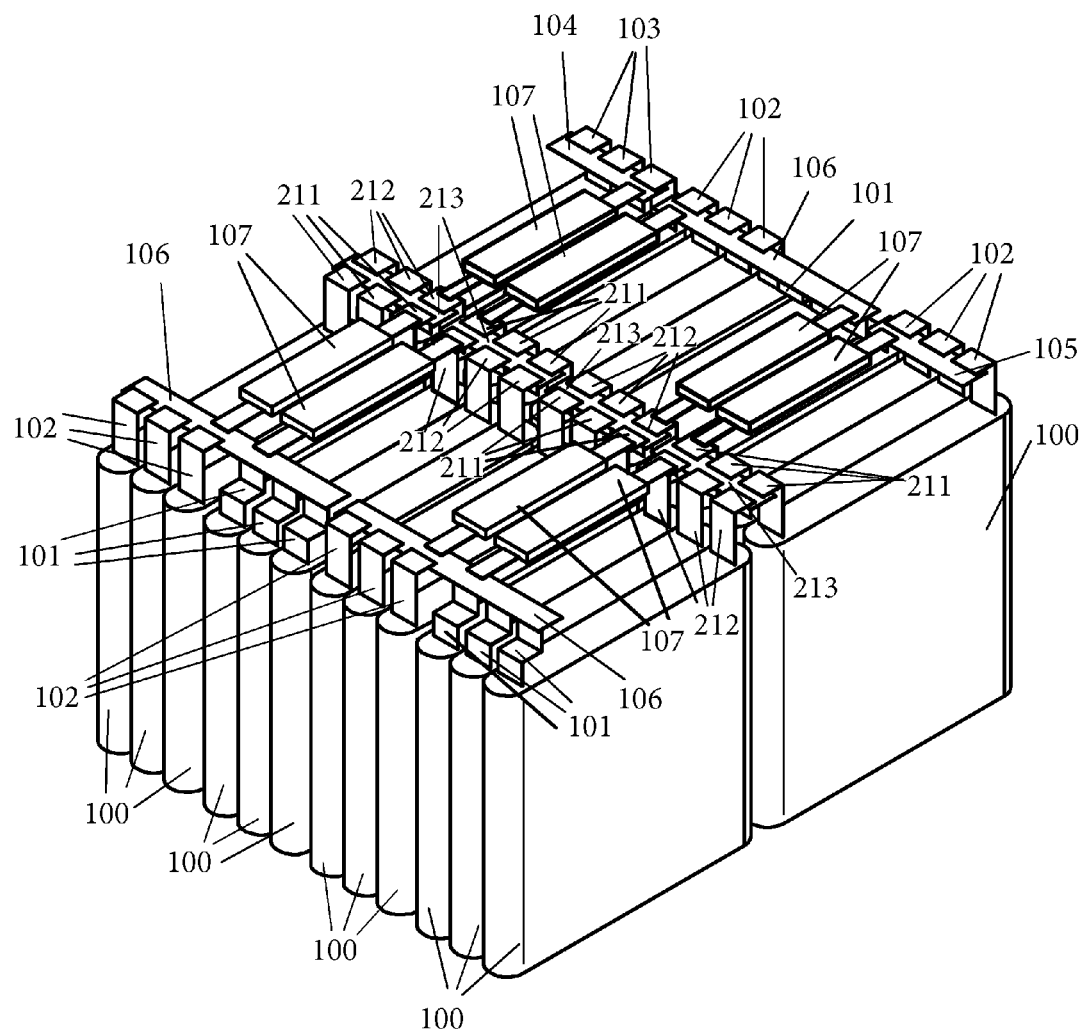
FIG. 2A is a view of a 24-cell lithium ion battery arranged as 12 cells side-by side showing parallel and series connections between cells.
Figure 2B:
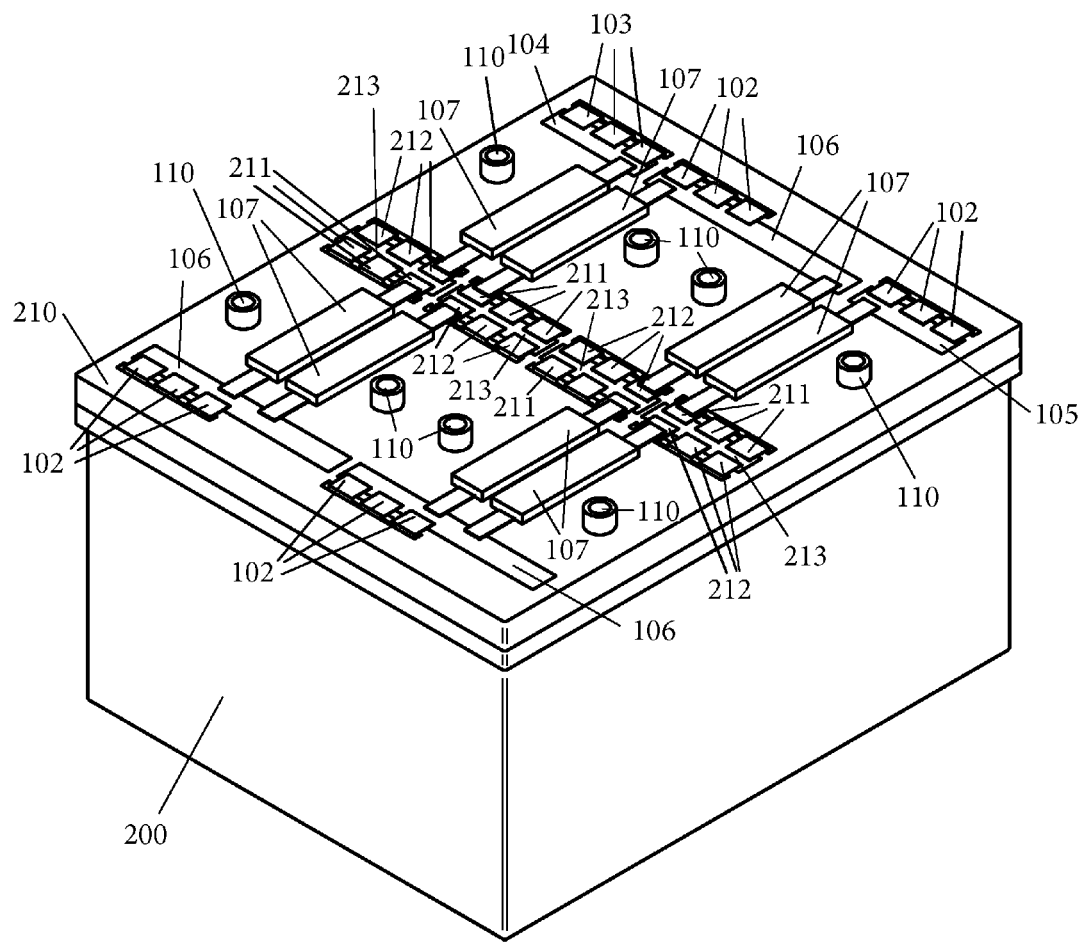
FIG. 2B is a view of the 24-cell lithium ion battery depicted in FIG. 2A showing the cells inside the case and external connections between the cells.
Figure 3A:
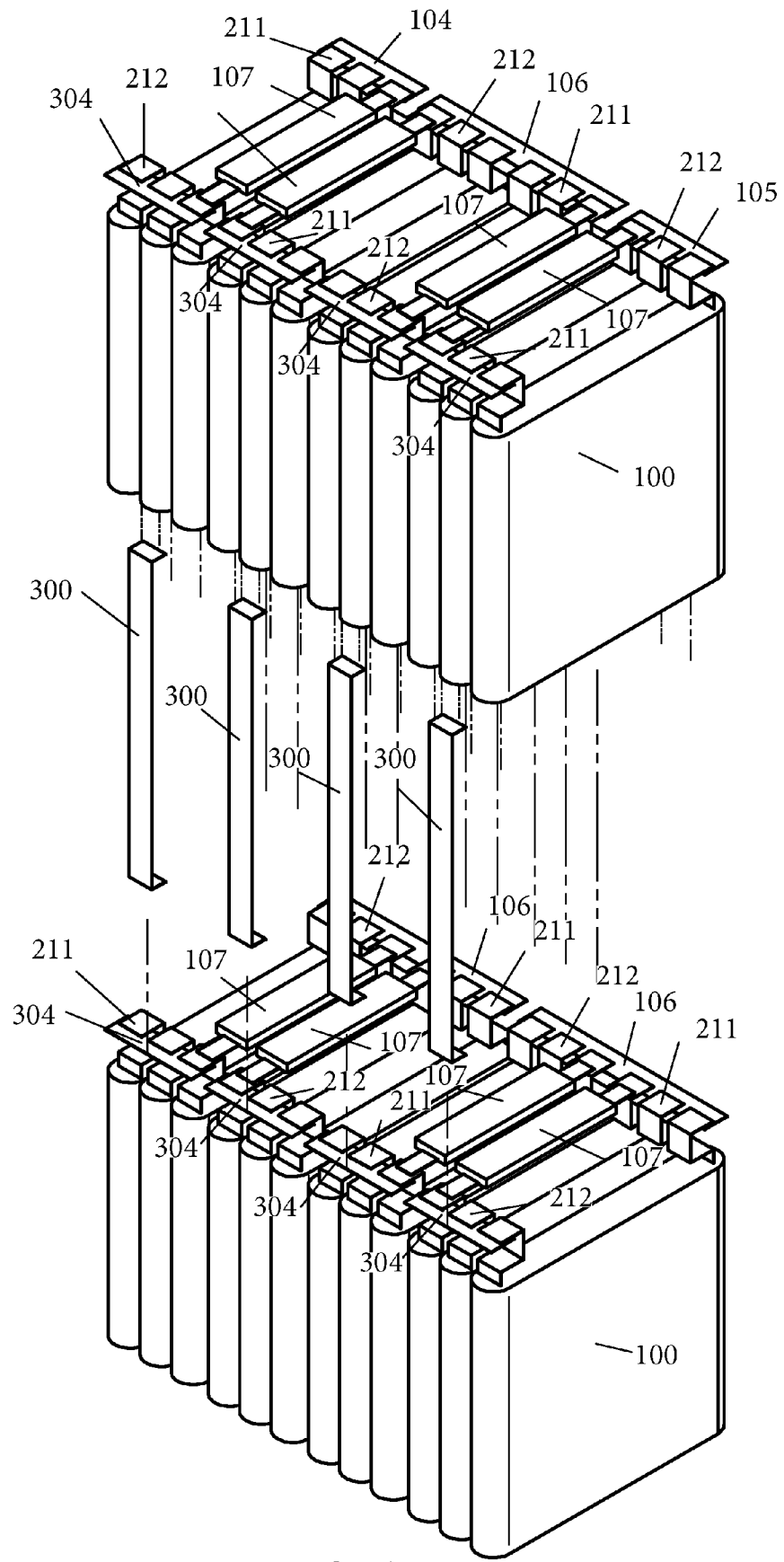
FIG. 3A is an exploded view of a 24-cell lithium ion battery arranged as 12 cells stacked atop 12 cells showing parallel and series connections between cells.
Figure 3B:
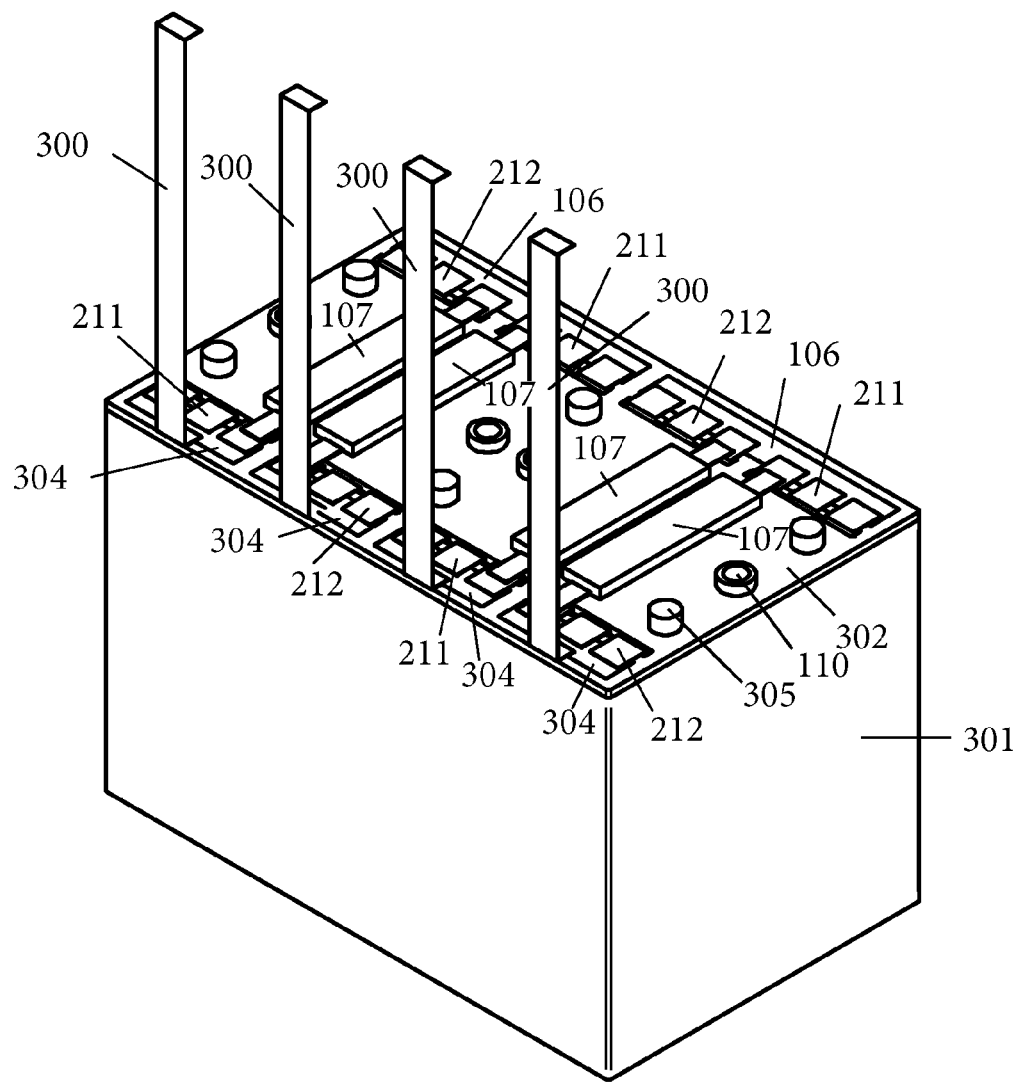
FIG. 3B is a view of the bottom 12 cells of the lithium ion battery depicted in FIG. 3A showing the cells inside the lower case and external connections between the cells.
Figure 3C:
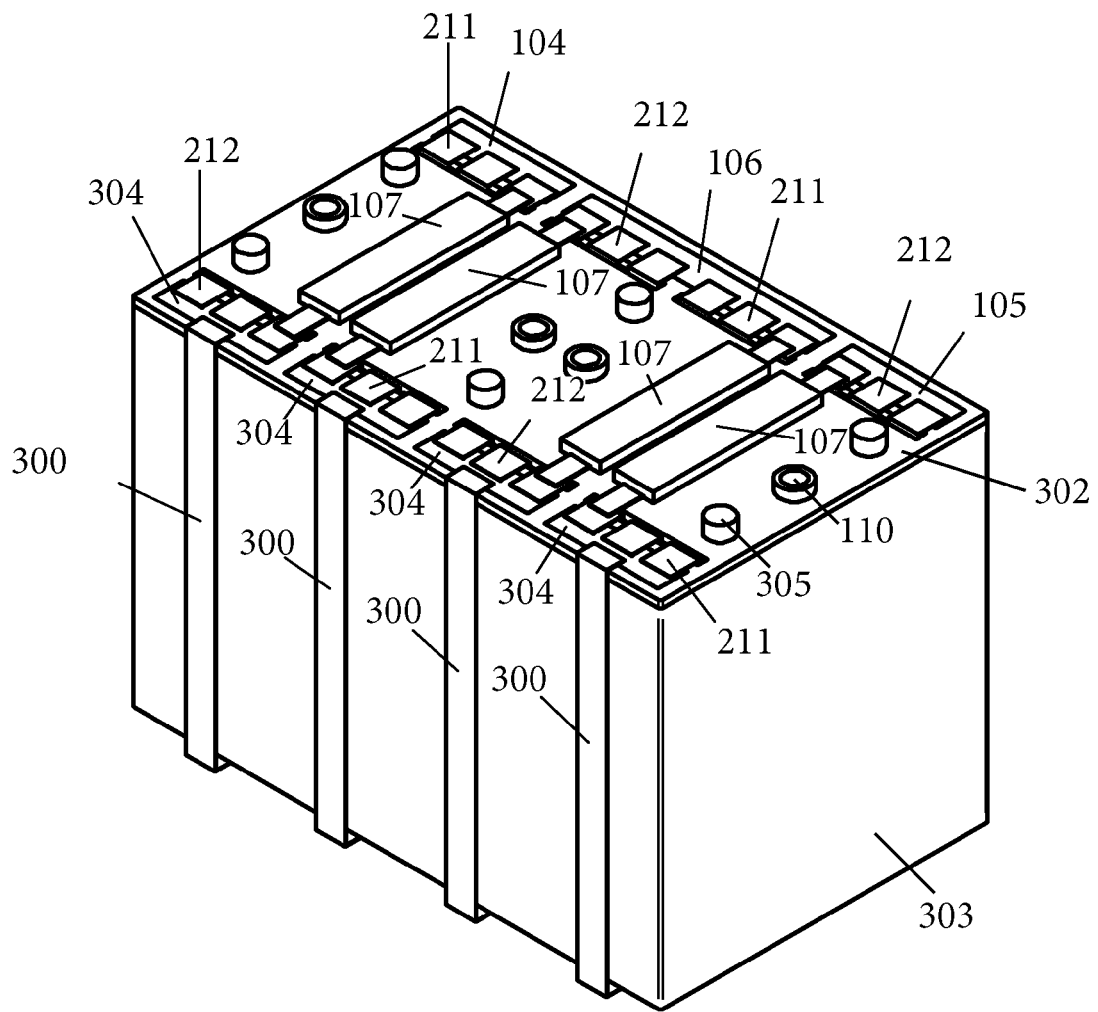
FIG. 3C is a view of the upper 12 cells of the lithium ion battery depicted in FIG. 3A showing the cells inside the upper case and external connections between the cells.
Figure 3D:
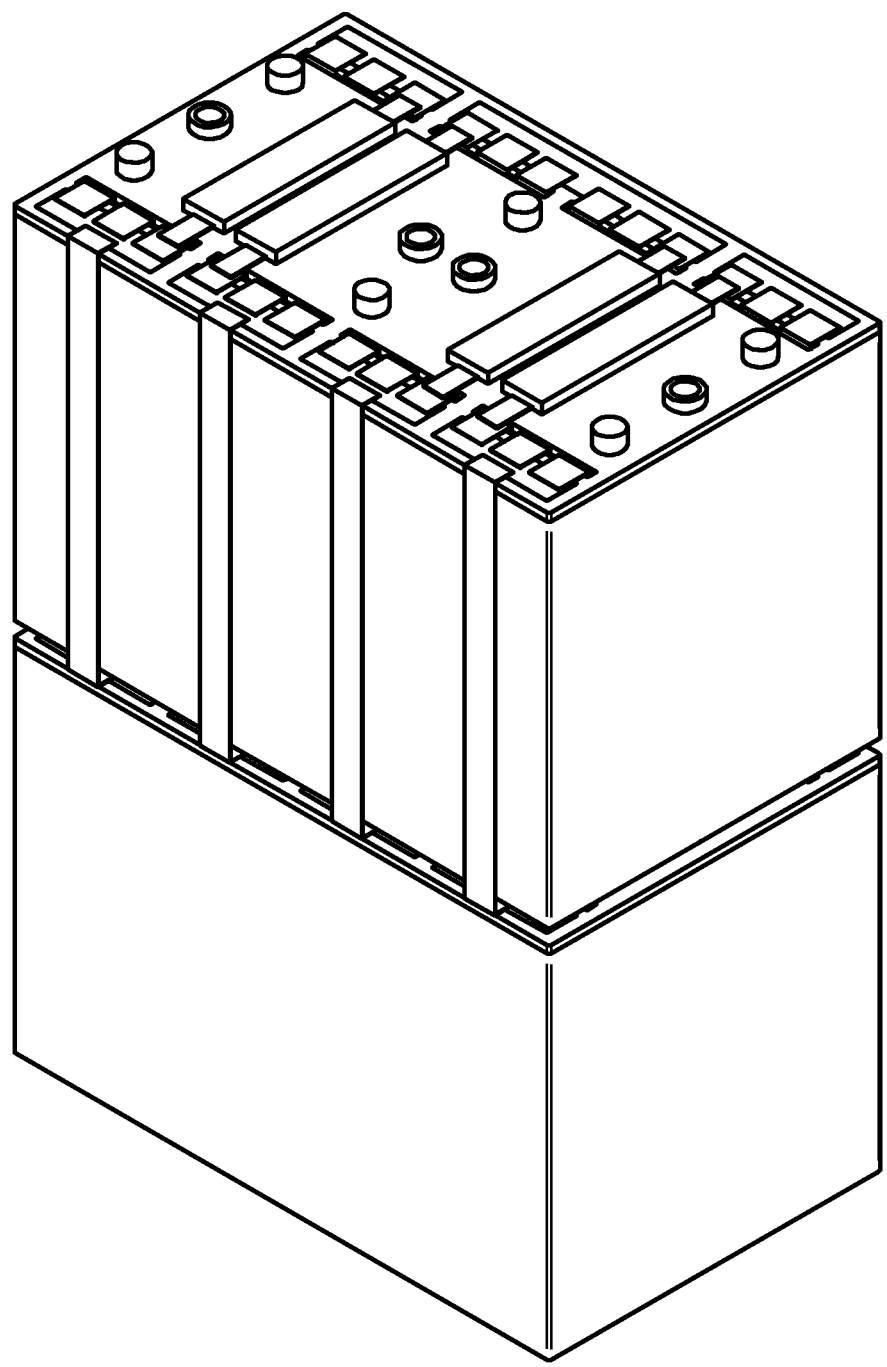
FIG. 3D is a complete view of the entire assembled 24-cell lithium ion battery shown in FIG. 3A.

In another embodiment, depicted in FIG. 2, is a 24-cell lithium ion battery arranged as 12 cells (100) side-by side. Referring to FIG. 2A, an internal view of a 2×12-cell lithium ion battery is depicted including the interconnections between the cells (100). Similar to Example 1 described above, each cell (100) is a prismatic jelly-roll cell including a positive current collector connected to a positive connector tab (102, 212) and a negative current collector connected to a negative connector tab (101, 103, 211). The cells (100) are interconnected via a cross-over connector (106, 213) which is attached to three positive connector tabs (102, 212) and three negative connector tabs (101, 211). Three cells (100) are connected to each other in parallel via the cross-over connector (106, 213), and each group of three parallel connected cells (100) are connected in series with another group of three parallel connected cells (100) via the cross-over connector (106, 213). A negative terminal (104) is connected to three negative connector tabs (103), and a positive terminal (105) is connected to three positive connector tabs (102). Optionally, a cell balancing device (107) can be included to normalize cell voltage during use. The cell balancing device (107) is connected between two cross-over connectors (106, 213). Turning to FIG. 2B, the cells (100) are contained within a case (200) that includes a case cover (210) having a safety vent (110).

Example 3

Alternative Embodiment of a Lithium Ion Battery that Includes 24 Lithium Ion Cells Referring to FIG. 3, an alternative embodiment of a 24-cell lithium ion battery is depicted arranged as 12 cells (100) atop 12 cells (100). FIG. 3A shows an internal view of a 2×12-cell lithium ion battery including the interconnections between the cells (100). Like the batteries described above in Examples 1 and 2, each cell (100) is a prismatic jelly-roll cell including a positive current collector connected to a positive connector tab (212) and a negative current collector connected to a negative connector tab (211). In each layer, the cells (100) are interconnected via a cross-over connector (106) which is attached to three positive connector tabs (212) and three negative connector tabs (211). Three cells (100) can be connected to each other in parallel via the cross-over connector (106) or via a parallel connector (304), and each group of three parallel connected cells (100) in a layer are connected in series with another group of three parallel connected cells (100) via the cross-over connector (106). Vertical cross-over connectors (300) are provided to establish a series connection between certain cells in the upper layer and cells in the lower layer. A negative terminal (104) is connected to three negative connector tabs (211), and a positive terminal (105) is connected to three positive connector tabs (212). Optionally, a cell balancing device (107) can be included to normalize cell voltage during use. The cell balancing device (107) is connected between the positive connector tab (212) and the negative connector tab (211) of a cell (100) that can be connected in parallel to other cells (100). FIG. 3B depicts the lower set of cells (100) inside a lower case (301) that is covered by a case cover (302). The vertical cross-over connectors (300) extend upwards from the case cover (302). The case cover (302) includes safety vents (110) and an alignment pin (305). The alignment pin (305) can be used to align the lower case (301) with the upper case (303) shown in FIG. 3C. The alignment pin (305) inserts into a corresponding indentation in the bottom of the upper case (303). This figure depicts the upper case (303) enclosing the cells (100) covered by a case cover (302). The vertical cross-over connectors (300) extend downwards from the top of the case cover (302) of the upper case (303) such that they can make contact with the parallel connectors (304) on the lower layer. The case cover (302) also includes safety vents (110) and alignment pins (305) that can be used to stack and properly align an additional layer of cells. FIG. 3D depicts the entire assembled battery.

Example 4

Lithium Ion Cell with 4 Cylindrical Cells in Series Configuration

Figure 4:
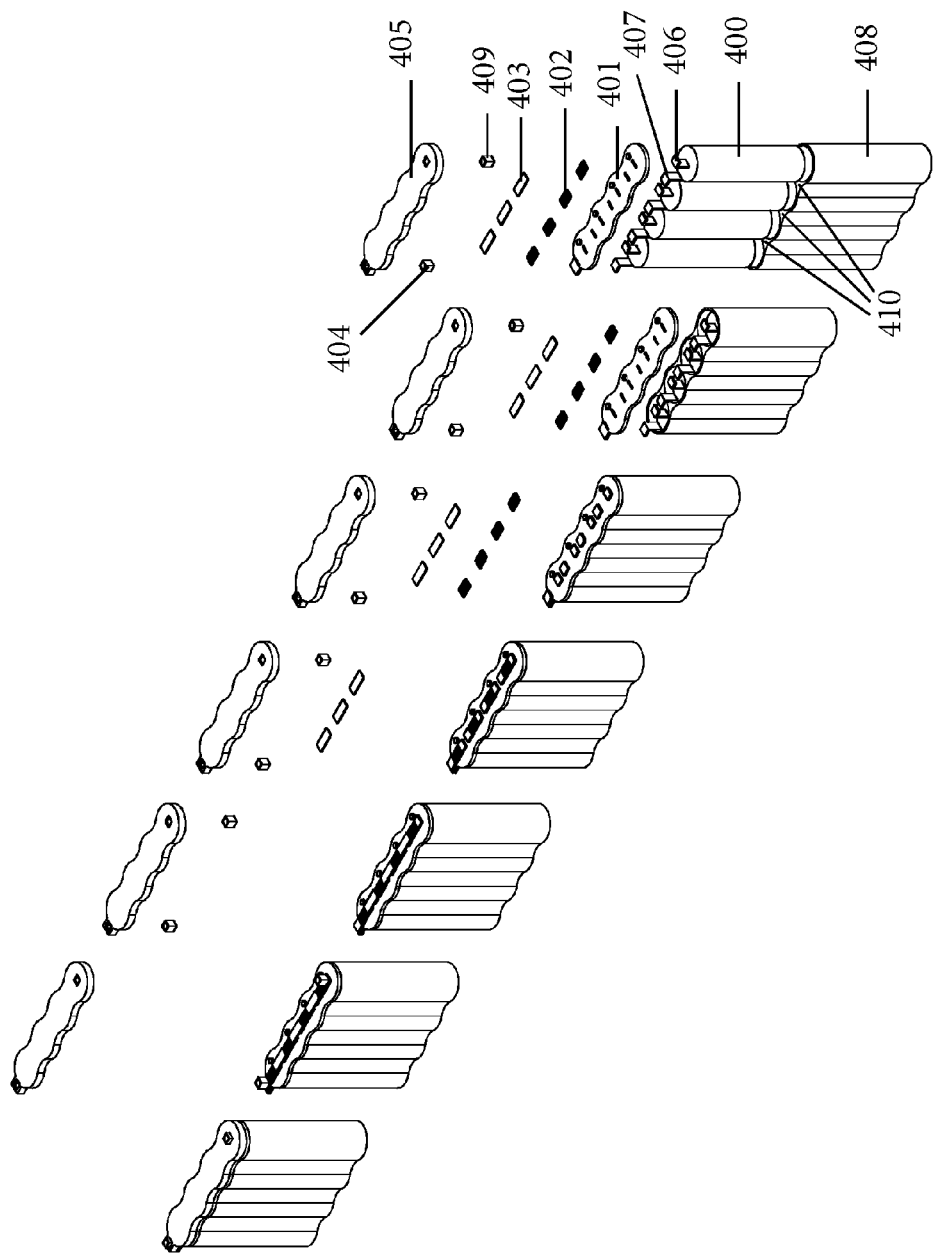
FIG. 4 is an exploded view of the construction of a 4-cell lithium ion battery showing series connections between the cells.

In an alternative embodiment depicted in FIG. 4, a 4-cell lithium ion battery includes 4 cylindrical cells (400) arranged side-by-side inside a case (408). Each cylindrical cell includes a positive current collector connected to a positive connector tab (406) and a negative current collector connected to a negative connector tab (407). The positive connector tabs (406) and the negative connector tabs (407) extend through a lower cover (401). Optionally, cell balancing devices (402) can be included which connect the positive connector tab (406) and the negative connector tab (407) of each cell (400). A cross-over connector (403) connects the negative connector tab (407) of one cell (400) with the positive connector tab (406) of an adjacent cell to establish a series connection. A positive terminal (409) is connected to the positive connector tab (406) of the right-most cell (400) and a negative terminal (404) is connected to the left-most negative connector tab (407). The positive terminal (409) and the negative terminal (404) extend through an upper cover (405). The cylindrical cells (400) are physically separated within the case (408) by a divider (410) that forms compartments within the case (408).

Example 5

Lithium Ion Battery Including 8 Cylindrical Lithium Ion Cells

Figure 5:
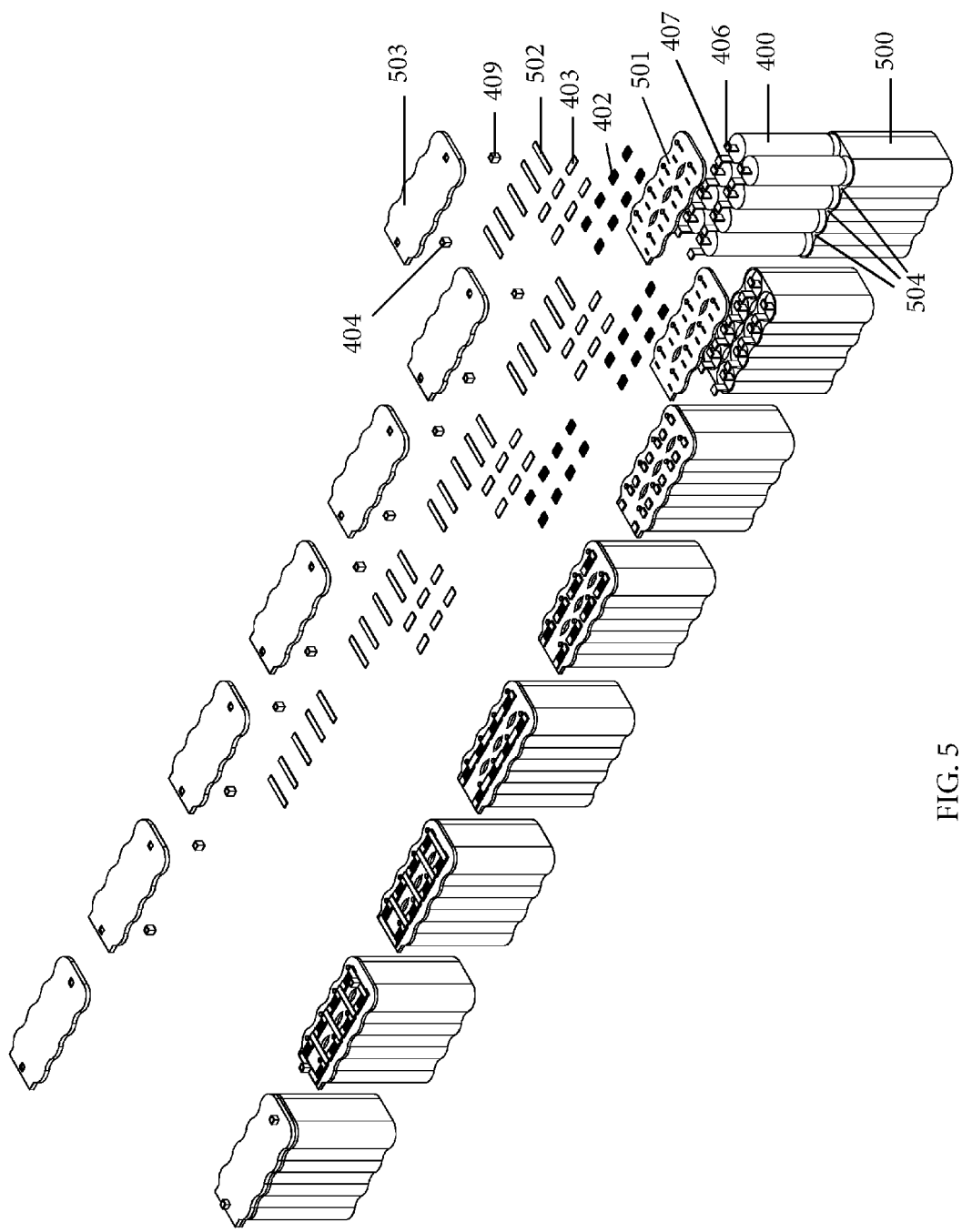
FIG. 5 is an exploded view of the construction of an 8-cell lithium ion battery showing parallel and series connections between the cells.

Referring to FIG. 5, another embodiment includes 8 cylindrical cells (400) arranged in two groups of 4 cells side-by-side inside a case (500). Similar to the battery of Example 4, each cylindrical cell includes a positive current collector connected to a positive connector tab (406) and a negative current collector connected to a negative connector tab (407). The positive connector tabs (406) and the negative connector tabs (407) extend through a lower cover (501). Optionally, cell balancing devices (402) can be included which connect the positive connector tab (406) and the negative connector tab (407) of each cell (400). A cross-over connector (403) connects the negative connector tab (407) of one cell (400) with the positive connector tab (406) of the adjacent cell to establish a series connection. Additionally, parallel connectors (502) at right angles to the cross-over connectors (403) connect the two groups of 4 cells in parallel. A positive terminal (409) is connected to the parallel connector (502) that connects the two right-most cells (400) and a negative terminal (404) is connected to the parallel connector (502) that connects the two left-most cells (400). The positive terminal (409) and the negative terminal (404) extend through an upper cover (503). The cylindrical cells (400) are physically separated within the case (500) by a divider (504) that forms compartments within the case (500).

Example 6

Lithium Ion Cell with 4 Cells in Series Configuration

A lithium ion battery was constructed as described above in Example 4 having 4 prismatic jelly-roll cells placed in a single case and connected in series to form a 12 V, 3 Ah battery. No voltage balancing devices were included. The voltage of each individual cell was measured, after which the battery was discharged and recharged. The voltage of each cell was measured after each of 27 discharge/recharge cycles. The results are shown in Table 1 below.

TABLE 1

| | Individual cell voltages | | | | | | | | | | | | | |
|---|---|---|---|---|---|---|---|---|---|---|---|---|---|---|
| | Before discharge | | | | | | | After discharge/recharge | | | | | | |
| Cycle time | S1 voltage | S2 voltage | S3 voltage | S4 voltage | MAX. | MIN. | ΔV | S1 voltage | S2 voltage | S3 voltage | S4 voltage | MAX. | MIN. | ΔV |
| 1 | 3.337 | 3.337 | 3.337 | 3.337 | 3.337 | 3.337 | 0.000 | 3.374 | 3.377 | 3.378 | 3.376 | 3.378 | 3.374 | 0.004 |
| 2 | 3.319 | 3.319 | 3.319 | 3.319 | 3.319 | 3.319 | 0.000 | 3.332 | 3.331 | 3.331 | 3.330 | 3.332 | 3.330 | 0.002 |
| 3 | 3.329 | 3.329 | 3.329 | 3.329 | 3.329 | 3.329 | 0.000 | 3.325 | 3.325 | 3.325 | 3.325 | 3.325 | 3.325 | 0.000 |
| 4 | 3.326 | 3.326 | 3.326 | 3.326 | 3.326 | 3.326 | 0.000 | 3.338 | 3.337 | 3.336 | 3.335 | 3.338 | 3.335 | 0.003 |
| 5 | 3.275 | 3.275 | 3.269 | 3.267 | 3.275 | 3.267 | 0.008 | 3.269 | 3.267 | 3.262 | 3.259 | 3.269 | 3.259 | 0.010 |
| 6 | 3.264 | 3.265 | 3.260 | 3.258 | 3.265 | 3.258 | 0.007 | 3.277 | 3.275 | 3.270 | 3.268 | 3.277 | 3.268 | 0.009 |
| 7 | 3.288 | 3.287 | 3.282 | 3.280 | 3.288 | 3.280 | 0.008 | 3.253 | 3.260 | 3.258 | 3.257 | 3.260 | 3.253 | 0.007 |
| 8 | 3.284 | 3.283 | 3.279 | 3.277 | 3.284 | 3.277 | 0.007 | 3.292 | 3.291 | 3.286 | 3.284 | 3.292 | 3.284 | 0.008 |
| 9 | 3.232 | 3.232 | 3.225 | 3.228 | 3.232 | 3.225 | 0.007 | 3.226 | 3.225 | 3.218 | 3.217 | 3.226 | 3.217 | 0.009 |
| 10 | 3.223 | 3.223 | 3.216 | 3.215 | 3.223 | 3.215 | 0.008 | 3.224 | 3.223 | 3.218 | 3.217 | 3.224 | 3.217 | 0.007 |
| 11 | 3.221 | 3.221 | 3.216 | 3.215 | 3.221 | 3.215 | 0.006 | 3.226 | 3.224 | 3.221 | 3.220 | 3.226 | 3.220 | 0.006 |
| 12 | 3.220 | 3.219 | 3.216 | 3.215 | 3.220 | 3.215 | 0.005 | 3.228 | 3.226 | 3.223 | 3.222 | 3.228 | 3.222 | 0.006 |
| 13 | 3.221 | 3.221 | 3.217 | 3.217 | 3.221 | 3.217 | 0.004 | 3.224 | 3.223 | 3.221 | 3.220 | 3.224 | 3.220 | 0.004 |
| 14 | 3.334 | 3.334 | 3.334 | 3.334 | 3.334 | 3.334 | 0.000 | 3.338 | 3.336 | 3.335 | 3.335 | 3.338 | 3.335 | 0.003 |
| 15 | 3.332 | 3.332 | 3.332 | 3.332 | 3.332 | 3.332 | 0.000 | 3.327 | 3.326 | 3.325 | 3.324 | 3.327 | 3.324 | 0.003 |
| 16 | 3.324 | 3.324 | 3.324 | 3.323 | 3.324 | 3.323 | 0.001 | 3.328 | 3.327 | 3.326 | 3.325 | 3.328 | 3.325 | 0.003 |
| 17 | 3.323 | 3.323 | 3.323 | 3.323 | 3.323 | 3.323 | 0.000 | 3.331 | 3.329 | 3.328 | 3.328 | 3.331 | 3.328 | 0.003 |
| 18 | 3.324 | 3.324 | 3.324 | 3.324 | 3.324 | 3.324 | 0.000 | 3.321 | 3.320 | 3.319 | 3.318 | 3.321 | 3.318 | 0.003 |
| 19 | 3.319 | 3.319 | 3.319 | 3.319 | 3.319 | 3.319 | 0.000 | 3.323 | 3.322 | 3.322 | 3.321 | 3.323 | 3.321 | 0.002 |
| 20 | 3.322 | 3.322 | 3.321 | 3.321 | 3.322 | 3.321 | 0.001 | 3.313 | 3.313 | 3.312 | 3.311 | 3.313 | 3.311 | 0.002 |
| 21 | 3.319 | 3.319 | 3.319 | 3.318 | 3.319 | 3.318 | 0.001 | 3.316 | 3.316 | 3.316 | 3.315 | 3.316 | 3.315 | 0.001 |
| 22 | 3.319 | 3.319 | 3.319 | 3.318 | 3.319 | 3.318 | 0.001 | 3.311 | 3.312 | 3.311 | 3.309 | 3.312 | 3.309 | 0.003 |
| 23 | 3.317 | 3.318 | 3.317 | 3.316 | 3.318 | 3.316 | 0.002 | 3.319 | 3.319 | 3.318 | 3.317 | 3.319 | 3.317 | 0.002 |
| 24 | 3.321 | 3.321 | 3.320 | 3.320 | 3.321 | 3.320 | 0.001 | 3.315 | 3.316 | 3.315 | 3.313 | 3.316 | 3.313 | 0.003 |
| 25 | 3.320 | 3.320 | 3.319 | 3.318 | 3.320 | 3.318 | 0.002 | 3.314 | 3.315 | 3.314 | 3.312 | 3.315 | 3.312 | 0.003 |
| 26 | 3.320 | 3.320 | 3.320 | 3.318 | 3.320 | 3.318 | 0.002 | 3.312 | 3.312 | 3.310 | 3.308 | 3.312 | 3.308 | 0.004 |
| 27 | 3.313 | 3.314 | 3.312 | 3.309 | 3.314 | 3.309 | 0.005 | 3.319 | 3.320 | 3.319 | 3.316 | 3.320 | 3.316 | 0.004 |

The results unexpectedly showed that the voltage of each cell varied by no more than 10 mV, even in the absence of any voltage balancing devices.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features. From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A lithium ion battery comprising:
a plurality of lithium ion cells aligned parallel to each other, each lithium ion cell containing a cathode in electronic contact with a positive current collector, an anode in electronic contact with a negative current collector, a separating unit that separates the cathode from the anode, and an electrolyte in contact with the cathode, the anode, and the separating unit;
a single positive terminal in electrical contact with one or more of the positive current collectors but not any of the negative current collectors;
a single negative terminal in electrical contact with one or more of the negative current collectors but not any of the positive current collectors;
one or more cross-over connectors that each electrically connects one or more of the positive current collectors with adjacent one or more of the negative current collectors;
a case that houses the lithium ion cells, the positive terminal, the negative terminal, and the cross-over connectors; and
a cover that encloses the case,
wherein each cathode contains a lithium cathode material, each anode contains an anode material; each separating unit contains a micro-porous material; the electrolyte is a liquid, a gel, or a polymeric solid; each of the positive terminal, the negative terminal, the positive current collectors, and the negative current collectors contains a metal tab; each of the cross-over connectors contains a metal bar; the cover has a first opening and a second opening; the positive terminal extends through the first opening; and the negative terminal extends through the second opening; and the case includes a divider that divides the case into at least two compartments, each compartment housing one or more of the lithium ion cells.

2. The lithium ion battery of claim 1, wherein the single positive terminal is in electrical contact with two or more of the positive current collectors but not any of the negative current collectors, the single negative terminal is in electrical contact with two or more of the negative current collectors but not any of the positive current collectors, and the one or more cross-over connectors each electrically connects with two or more of the positive current collectors and two or more of the negative current collectors.

3. The lithium ion battery of claim 2, wherein each of the positive current collectors is welded to the positive terminal or one of the cross-over connectors to which they are connected and each of the negative current collectors is welded to the negative terminal or one of the cross-over connectors to which they are connected.

4. The lithium ion battery of claim 3, wherein each of the lithium ion cells is a prismatic jelly roll having a cell body defined by a top side, a bottom side, a first end, a second end, a front surface, and a back surface; the positive current collector, proximate to the first end, extends from the top side away from the cell body in a direction parallel to the first end; and the negative current collector, proximate to the second end, extends also from the top side away from the cell body in a direction parallel to the second end.

5. The lithium ion battery of claim 4, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

6. The lithium ion battery of claim 5, wherein the lithium cathode material is lithium cobalt oxide, lithium nickel oxide, lithium manganese oxide, lithium iron phosphate, lithium nickel manganese cobalt oxide, or a combination thereof; the anode material is carbon, lithium titanium oxide, silicon, silicon oxide, or a combination thereof; the separating unit is formed of a micro-porous membrane, paper, a fiber, or a non-woven polymer; and the electrolyte is $LiPF_6$, $LiBF_4$, or $LiClO_4$ or a combination thereof.

7. The lithium ion battery of claim 3, wherein each of the lithium ion cells is a cylindrical jelly roll having a cell body including a top side and a bottom side defining an center axis therebetween, and an outer surface; the positive current collector extends from a center of the top side away from the cell body in a direction parallel to the axis; and the negative current collector, proximate to the outer surface, extends from the top side away from the cell body also in a direction parallel to the axis.

8. The lithium ion battery of claim 7, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

9. The lithium ion battery of claim 8, wherein the lithium cathode material is lithium cobalt oxide, lithium nickel oxide, lithium manganese oxide, lithium iron phosphate, lithium nickel manganese cobalt oxide, or a combination thereof; the anode material is carbon, lithium titanium oxide, silicon, silicon oxide, or a combination thereof; and the separating unit is formed of a micro-porous membrane, paper, a fiber, or a non-woven polymer.

10. The lithium battery of claim 1, wherein each of the positive current collectors is welded to the positive terminal or one of the cross-over connectors to which they are connected, and each of the negative current collectors is welded to the negative terminal or one of the cross-over connectors to which they are connected.

11. The lithium ion battery of claim 10, wherein each of the lithium ion cells is a cylindrical jelly roll having a cell body including a top side and a bottom side defining a center axis therebetween, and an outer surface; the positive current collector extends from a center of the top side away from the cell body in a direction parallel to the axis; and the negative current collector, proximate to the outer surface, extends from the top side away from the cell body also in a direction parallel to the axis.

12. The lithium ion battery of claim 11, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

13. The lithium ion battery of claim 12, wherein the lithium cathode material is lithium cobalt oxide, lithium nickel oxide, lithium manganese oxide, lithium iron phosphate, lithium (nickel, manganese, cobalt) oxide, or a combination thereof; the anode material is carbon, lithium titanium oxide, silicon, silicon oxide, or a combination thereof; and the separating unit is formed of a micro-porous membrane, paper, a fiber, or a non-woven polymer.

14. The lithium ion battery of claim 10, wherein each of the lithium ion cells is a prismatic jelly roll having a cell body defined by a top side, a bottom side, a first end, a second end, a front surface, and a back surface; the positive current collector, proximate to the first end, extends from the top side away from the cell body in a direction parallel to the first end; and the negative current collector, proximate to the second end, extends also from the top side away from the cell body in a direction parallel to the second end.

15. The lithium ion battery of claim 14, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

16. The lithium ion battery of claim 15, wherein the lithium cathode material is lithium cobalt oxide, lithium nickel oxide, lithium manganese oxide, lithium iron phosphate, lithium (nickel, manganese, cobalt) oxide, or a combination thereof; the anode material is carbon, lithium titanium oxide, silicon, silicon oxide, or a combination thereof; and the separating unit is formed of a micro-porous membrane, paper, fiber, or a non-woven polymer.

17. The lithium ion battery of claim 1, wherein each of the lithium ion cells is a prismatic jelly roll having a cell body defined by a top side, a bottom side, a first end, a second end, a front surface, and a back surface; the positive current collector, proximate to the first end, extends from the top side away from the cell body in a direction parallel to the first end; and the negative current collector, proximate to the second end, extends also from the top side away from the cell body in a direction parallel to the second end.

18. The lithium ion battery of claim 17, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

19. The lithium ion battery of claim 1, wherein each of the lithium ion cells is a cylindrical jelly roll having a cell body including a top side and a bottom side defining an center axis therebetween, and an outer surface; the positive current collector extends from a center of the top side away from the cell body in a direction parallel to the axis; and the negative current collector, proximate to the outer surface, extends from the top side away from the cell body also in a direction parallel to the axis.

20. The lithium ion battery of claim 19, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

21. The lithium ion battery of claim 1, further comprising a plurality of balancing devices each connecting the positive terminal and one of the cross-over connectors, connecting two of the cross-over connectors, or connecting the negative terminal and one of the cross-over connectors, whereby the positive current collector and the negative current collector of each of the lithium ion cells are connected by at least one of the balancing devices, the balancing devices capable of limiting a charging voltage applied to each of the lithium ion cells to a predetermined range.

22. The lithium ion battery of claim 21, wherein the single positive terminal is in direct contact with two or more of the positive current collectors but not any of the negative current collectors, the single negative terminal is in direct contact with two or more of the negative current collectors but not any of the positive current collectors, and the one or more cross-over connectors each electrically connects with two or more of the positive current collectors and two or more of the negative current collectors.

23. The lithium ion battery of claim 21, wherein each of the positive current collectors is welded to the positive terminal or one of the cross-over connectors to which they are connected, and each of the negative current collectors is welded to the negative terminal or one of the cross-over connectors to which they are connected.

* * * * *